United States Patent
Ohta et al.

(10) Patent No.: US 11,218,972 B2
(45) Date of Patent: Jan. 4, 2022

(54) CONTROLLING POWER BASED ON CALCULATED TRANSMISSION POWER TO CANDIDATES FOR COMMUNICATION

(71) Applicant: FUJITSU LIMITED, Kawasaki (JP)

(72) Inventors: Yoshiaki Ohta, Yokohama (JP);
Yoshihiro Kawasaki, Kawasaki (JP);
Takayoshi Ode, Yokohama (JP);
Shinichiro Aikawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/551,031

(22) Filed: Aug. 26, 2019

(65) Prior Publication Data
US 2019/0387476 A1 Dec. 19, 2019

Related U.S. Application Data

(63) Continuation of application No. PCT/JP2017/010177, filed on Mar. 14, 2017.

(51) Int. Cl.
*H04W 52/08* (2009.01)
*H04W 52/28* (2009.01)
*H04W 24/02* (2009.01)

(52) U.S. Cl.
CPC ........... *H04W 52/08* (2013.01); *H04W 24/02* (2013.01); *H04W 52/28* (2013.01)

(58) Field of Classification Search
CPC ..... H04W 24/02; H04W 36/08; H04W 36/36; H04W 48/20; H04W 52/08;
(Continued)

(56) References Cited

U.S. PATENT DOCUMENTS

2006/0178167 A1  8/2006  Tamura et al.
2006/0286996 A1  12/2006  Julian et al.
(Continued)

FOREIGN PATENT DOCUMENTS

JP  H04-356825 A  12/1992
JP  H09-093188 A  4/1997
(Continued)

OTHER PUBLICATIONS

3GPP TR 38.802 V14.2.0 (Sep. 2017) Technical Report 3rd Generation Partnership Project; Technical Specification Group Radio Access Network; Study on New Radio Access Technology Physical Layer Aspects (Release 14).
(Continued)

*Primary Examiner* — Philip Sobutka
(74) *Attorney, Agent, or Firm* — Myers Wolin, LLC

(57) ABSTRACT

A communication apparatus in a communication system including a plurality of communication apparatuses, the communication apparatus includes a controller configured to, in a wireless communication with another communication apparatus, considering with power information related to a power amount of a signal to be transmitted from the communication apparatus to candidate communication apparatuses that are candidates for performing the wireless communication, calculate a transmission power amount for the candidate communication apparatuses, and perform a control such that a candidate communication apparatus for which the calculated transmission power amount is the smallest becomes the other communication apparatus for performing the wireless communication, and a transmitter configured to transmit a signal to the other communication apparatus considering with the power information.

19 Claims, 16 Drawing Sheets

(58) Field of Classification Search
CPC ............ H04W 52/146; H04W 52/242; H04W 52/245; H04W 52/28
USPC ......................................................... 455/522
See application file for complete search history.

(56) References Cited

U.S. PATENT DOCUMENTS

| | | | |
|---|---|---|---|
| 2008/0159184 A1* | 7/2008 | Niwano | H04W 52/346 370/278 |
| 2010/0172291 A1 | 7/2010 | Kim et al. | |
| 2010/0329137 A1 | 12/2010 | Yamada et al. | |
| 2013/0137416 A1* | 5/2013 | Obuchi | H04W 52/282 455/418 |
| 2014/0211737 A1* | 7/2014 | Takeda | H04W 52/325 370/329 |
| 2015/0045084 A1 | 2/2015 | Morimoto et al. | |
| 2015/0092699 A1 | 4/2015 | Chen et al. | |

FOREIGN PATENT DOCUMENTS

| | | | |
|---|---|---|---|
| JP | 2000-023238 A | 1/2000 | |
| JP | 2005-348433 A | 12/2005 | |
| JP | 2008-547278 A | 12/2008 | |
| JP | 2011-009975 A | 1/2011 | |
| JP | 2012-514903 A | 6/2012 | |
| JP | 2016-536847 A | 11/2016 | |
| WO | 98048528 A1 | 10/1998 | |
| WO | 2013128959 A1 | 9/2013 | |

OTHER PUBLICATIONS

3GPP TR 38.803 V14.2.0 (Sep. 2017) Technical Report 3rd Generation Partnership Project; Technical Specification Group Radio Access Network; Study on new radio access technology: Radio Frequency (RF) and co-existence aspects (Release 14).
3GPP TR 38.804 V14.0.0 (Mar. 2017) Technical Report 3rd Generation Partnership Project; Technical Specification Group Radio Access Network; Study on New Radio Access Technology; Radio Interface Protocol Aspects (Release 14).
3GPP TR 38.900 V14.3.1 (Jul. 2017) Technical Report 3rd Generation Partnership Project; Technical Specification Group Radio Access Network; Study on channel model for frequency spectrum above 6 GHz (Release 14).
3GPP TR 38.912 V14.1.0 (Jun. 2017) Technical Specification 3rd Generation Partnership Project; Technical Specification Group Radio Access Network; Study on New Radio (NR) access technology (Release 14).
3GPP TR 38.913 V14.3.0 (Jun. 2017) Technical Report 3rd Generation Partnership Project; Technical Specification Group Radio Access Network; Study on Scenarios and Requirements for Next Generation Access Technologies (Release 14).
3GPP TR 38.801 V14.0.0 (Mar. 2017) Technical Report 3rd Generation Partnership Project; Technical Specification Group Radio Access Network; Study on new radio access technology: Radio access architecture and interfaces (Release 14).
3GPP TS 36.425 V14.0.0 (Mar. 2017) Technical Specification 3rd Generation Partnership Project; Technical Specification Group Radio Access Network; Evolved Universal Terrestrial Radio Access Network (E-Utran); X2 interface user plane protocol (Release 14).
3GPP TS 36.423 V15.0.0 (Feb. 2017) Technical Specification 3rd Generation Partnership Project; Technical Specification Group Radio Access Network; Evolved Universal Terrestrial Radio Access Network (E-UTRAN); X2 application protocol (X2AP) (Release 15).
3GPP TS 36.413 V15.0.0 (Dec. 2017) Technical Specification 3rd Generation Partnership Project; Technical Specification Group Radio Access Network; Evolved Universal Terrestrial Radio Access Network (E-UTRAN) S1 Application Protocol (S1AP) (Release 15).
3GPP TS 36.331 V15.0.1 (Jan. 2018) Technical Specification 3rd Generation Partnership Project; Technical Specification Group Radio Access Network; Evolved Universal Terrestrial Radio Access (E-UTRA); Radio Resource Control (RRC); Protocol specification (Release 15).
3GPP TS 36.323 V14.5.0 (Dec. 2017) Technical Specification 3rd Generation Partnership Project; Technical Specification Group Radio Access Network; Evolved Universal Terrestrial Radio Access (E-UTRA); Packet Data Convergence Protocol (PDCP) specification (Release 14).
3GPP TS 36.322 V15.0.0 (Dec. 2017) Technical Specification 3rd Generation Partnership Project; Technical Specification Group Radio Access Network; Evolved Universal Terrestrial Radio Access (E-UTRA); Radio Link Control (RLC) protocol specification (Release 15).
3GPP TS 36.321 V15.0.0 (Dec. 2017) Technical Specification 3rd Generation Partnership Project;Technical Specification Group Radio Access Network; Evolved Universal Terrestrial Radio Access (E-UTRA); Medium Access Control (MAC) protocol specification (Release 15).
3GPP TS 36.300 V15.0.0 (Dec. 2017) Technical Specification 3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 15).
3GPP TS 36.213 V15.0.0 (Dec. 2017) Technical Specification 3rd Generation Partnership Project; Technical Specification Group Radio Access Network; Evolved Universal Terrestrial Radio Access (E-UTRA); Physical layer procedures (Release 15).
3GPP TS 36.212 V15.0.1 (Jan. 2018) Technical Specification 3rd Generation Partnership Project; Technical Specification Group Radio Access Network; Evolved Universal Terrestrial Radio Access (E-UTRA); Multiplexing and channel coding (Release 15).
3GPP TS 36.211 V15.0.0 (Dec. 2017) Technical Specification 3rd Generation Partnership Project; Technical Specification Group Radio Access Network; Evolved Universal Terrestrial Radio Access (E-UTRA); Physical channels and modulation (Release 15).
International Search Report issued for corresponding International Patent Application No. PCT/JP2017/010177, dated May 23, 2017. English translation attached.
The Written Opinion issued for for corresponding International Patent Application No. PCT/JP2017/010177, dated May 23, 2017. English translation attached.
Notice of Reasons for Refusal issued by the Japan Patent Office for corresponding Japanese Patent Application No. 2019-505558, dated Jul. 21, 2020 with a full machine English translation.
Notice of Reasons for Refusal issued by the Japan Patent Office for corresponding Japanese Patent Application No. 2019-505558, dated Dec. 15, 2020, with an English translation.

* cited by examiner

FIG.7

| BASE STATION APPARATUS | RECEPTION SENSITIVITY | REQUIRED RECEPTION POWER |
|---|---|---|
| 200-1 | 10 | 40 |
| 200-2 | 20 | 35 |

FIG.9

| BASE STATION APPARATUS | RECEPTION SENSITIVITY | REQUIRED RECEPTION POWER | TRANSMISSION POWER |
|---|---|---|---|
| 200-1 | 10 | 40 | 50 |
| 200-2 | 20 | 35 | 55 |

FIG.10

| BASE STATION APPARATUS | RECEPTION SENSITIVITY | REQUIRED RECEPTION POWER | PATH LOSS | TRANSMISSION POWER |
|---|---|---|---|---|
| 200-1 | 10 | 40 | 10 | 60 |
| 200-2 | 20 | 35 | 8 | 63 |

FIG.14

| BASE STATION APPARATUS | INITIAL TRANSMISSION POWER | POWER CONTROL VALUE |
|---|---|---|
| 200-1 | 20 | +5 |
| 200-2 | 20 | +10 |

FIG.16

| BASE STATION APPARATUS | INITIAL TRANSMISSION POWER | POWER CONTROL VALUE | TRANSMISSION OUTPUT |
|---|---|---|---|
| 200-1 | 20 | +5 | 25 |
| 200-2 | 20 | +10 | 30 |

CONTROLLING POWER BASED ON CALCULATED TRANSMISSION POWER TO CANDIDATES FOR COMMUNICATION

CROSS-REFERENCE TO RELATED APPLICATION

This application is a continuation application of International Application PCT/JP2017/010177 filed on Mar. 14, 2017 and designated the U.S., the entire contents of which are incorporated herein by reference.

FIELD

The present invention relates to a communication apparatus, a communication system, and a communication method.

BACKGROUND

In recent years, a wireless communication system may be configured by HetNet (Heterogeneous Network). HetNet is a network in which, for example, a plurality of base station apparatuses having different ranges (hereinafter referred to as service areas) in which terminal apparatuses can be connected to and communicate with each other by wireless are hierarchically configured. In HetNet, there are a plurality of base station apparatuses (hereinafter sometimes referred to as femtocells) each having a narrower service area within a service area a base station apparatus (hereinafter sometimes referred to as a macrocell) that has a wider service area.

To reduce the amount of decrease of transmission power in a wireless section (hereinafter sometimes referred to as path loss), it is preferable that a terminal apparatus wirelessly connect to a base station apparatus that is close in distance. In the HetNet wireless communication system, since the femtocell has a narrower service area than the macrocell, the femtocell is more likely to be closer to a terminal apparatus than the macrocell. Therefore, there is a technology for guiding a terminal apparatus to wirelessly connect to a femtocell, for example, a technology called CRE (Cell Range Expansion).

CRE is a technology that extends the service area of the femtocell, arranges a terminal apparatus located outside the service area of the femtocell within the service area of the femtocell, and guides the terminal apparatus to perform wireless communication with the femtocell.

Technologies related to femtocells are disclosed in Patent Literature 1 and 2 below. Further, technologies relating to wireless communication are disclosed in the following Non-patent Literature 1 to 18.

CITATION LIST

Patent Literature

Patent Literature 1: International Publication Pamphlet No. WO2013/128959
Patent Literature 2: Japanese Laid-open Patent Publication No. 2005-348433

Non-Patent Literature

Non Patent Literature 1: 3GPP TS36.300
Non Patent Literature 2: 3GPP TS36.211
Non Patent Literature 3: 3GPP TS36.212
Non Patent Literature 4: 3GPP TS36.213
Non Patent Literature 5: 3GPP TS36.321
Non Patent Literature 6: 3GPP TS36.322
Non Patent Literature 7: 3GPP TS36.323
Non Patent Literature 8: 3GPP TS36.331
Non Patent Literature 9: 3GPP TS36.413
Non Patent Literature 10: 3GPP TS36.423
Non Patent Literature 11: 3GPP TS36.425
Non Patent Literature 12: 3GPP TR38.912
Non Patent Literature 13: 3GPP TR38.913
Non Patent Literature 14: 3GPP TR38.801
Non Patent Literature 15: 3GPP TR38.802
Non Patent Literature 16: 3GPP TR38.803
Non Patent Literature 17: 3GPP TR38.804
Non Patent Literature 18: 3GPP TR38.900

SUMMARY

A communication apparatus in a communication system including a plurality of communication apparatuses, the communication apparatus includes a controller configured to, in a wireless communication with another communication apparatus, considering with power information related to a power amount of a signal to be transmitted from the communication apparatus to candidate communication apparatuses that are candidates for performing the wireless communication, calculate a transmission power amount for the candidate communication apparatuses, and perform a control such that a candidate communication apparatus for which the calculated transmission power amount is the smallest becomes the other communication apparatus for performing the wireless communication, and a transmitter configured to transmit a signal to the other communication apparatus considering with the power information.

In one disclosure, one disclosure, a base station apparatus in which decrease in throughput, radio resource inefficiency, or decrease in frequency utilization efficiency does not occur can be selected.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an example of the power information table 123 at the end of the power information acquisition process.

FIG. 9 is a diagram illustrating an example of the power information table 123 including the transmission power.

FIG. 10 is a diagram illustrating an example of the power information table 123 in a modification of the second embodiment.

FIG. 14 is a diagram illustrating an example of the power information table 123 at the end of the power information acquisition process.

FIG. 16 is a diagram illustrating an example of the power information table 123 including the transmission power.

DESCRIPTION OF EMBODIMENTS

Figure 1:
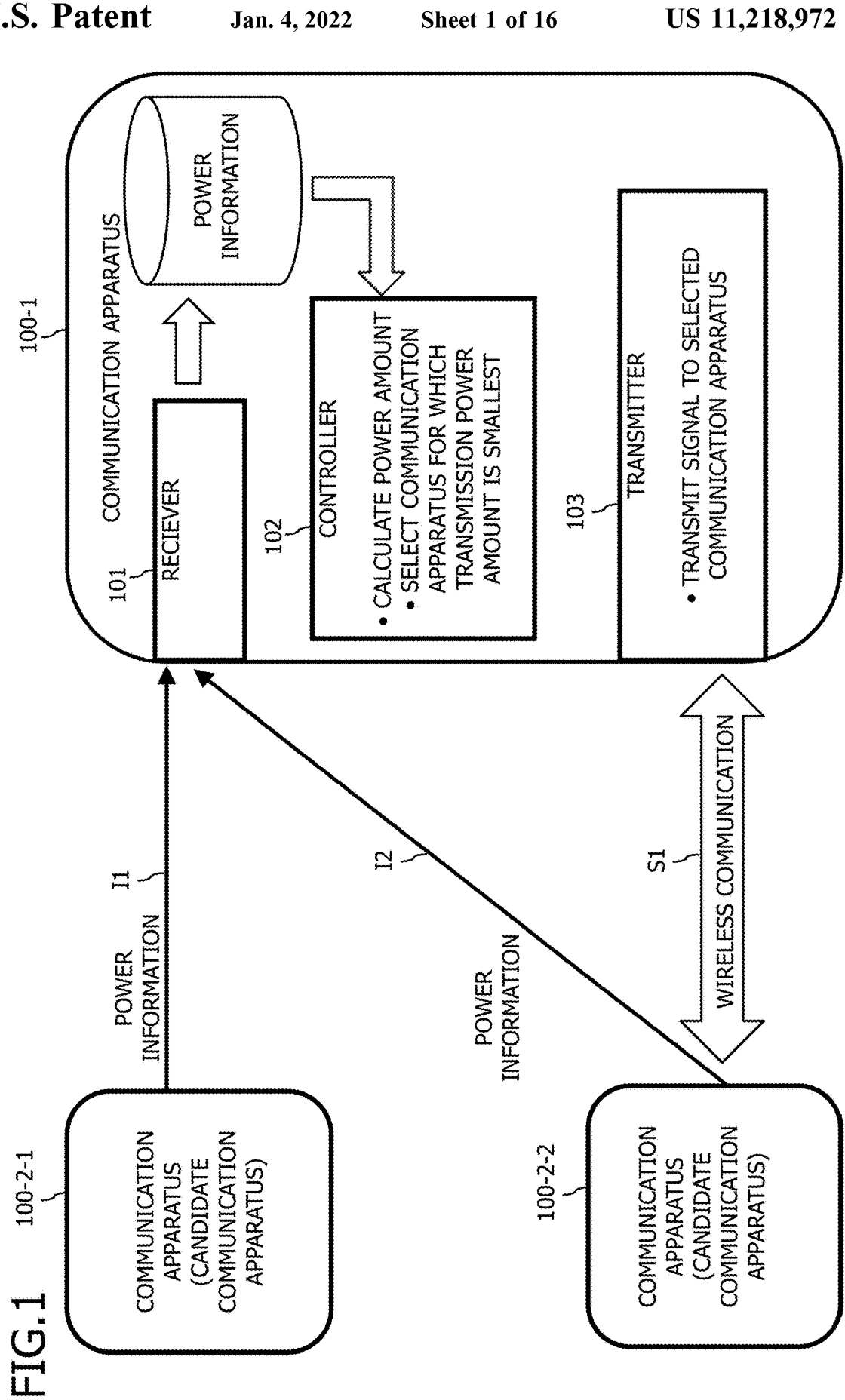
FIG. 1 is a diagram illustrating a configuration example of the communication system in the first embodiment.

When a terminal apparatus is capable of wireless communication with a plurality of base station apparatuses, for example, there is a case where a signal transmitted by a base station apparatus is received, a path loss in the direction from the base station apparatus to the terminal apparatus (hereinafter sometimes referred to as downlink) is measured, and the terminal apparatus then wirelessly connects to a base station apparatus having a small amount of path loss measured.

In this case, there is a high possibility that the terminal apparatus can receive radio waves in good condition from the base station apparatus. However, depending on either the state of a wireless section in the direction from the terminal apparatus to the base station apparatus (hereinafter sometimes referred to as uplink) or the performance of the base station apparatus, there is a case where the terminal apparatus fails to select a base station apparatus that receives radio waves in optimal condition. When the radio waves received by the base station apparatus are not good, for example, a delay of data transmission occurs in uplink, and the throughput of the terminal apparatus decreases. In addition, when the terminal apparatus retransmits the same data, the efficiency of radio resources and the efficiency of frequency utilization also decrease.

Hereinafter, the present embodiments will be described in detail with reference to the drawings. The problems and examples in the present description are examples and do not limit the scope of the present application. In particular, even if a different expression is used, the different expression can be applied to the technical scope of the present application and do not limit the scope of the right as long as both expressions are technically equivalent.

First Embodiment

A first embodiment will be described. The communication system is a communication system having a plurality of communication apparatuses. The communication apparatus includes, for example, a controller and a transmitter. The controller, in a wireless communication with another communication apparatus, considering with power information related to a power amount of a signal to be transmitted from the communication apparatus to candidate communication apparatuses that are candidates for performing the wireless communication, calculates a transmission power amount for the candidate communication apparatuses. The controller then performs a control such that a candidate communication apparatus for which the calculated transmission power amount is the smallest becomes the other communication apparatus for performing the wireless communication. The transmitter transmits a signal to the other communication apparatus considering with the power information. It is noted that the transmission power amount is preferably minimized, but communication may be performed with another communication apparatus using not the smallest transmission power but a transmission power as small as possible, depending on other conditions. In the following description, the phrase "the transmission power amount is the smallest" as used may be replaced with "the transmission power is as small as possible".

FIG. 1 is a diagram illustrating a configuration example of the communication system in the first embodiment. The communication system includes a communication apparatus 100-1 and communication apparatuses 100-2-1, 2 (hereinafter sometimes referred to as (a) communication apparatus (es) 100-2). The communication apparatus 100-1 connects to the communication apparatus 100-2 by wireless, and transmits and receives data using, for example, packets. Further, the communication apparatus 100-1 and the communication apparatus 100-2 may be connected to each other via, for example, a relay apparatus.

The communication apparatus 100-1 includes a processor, a storage, and a memory, which are not illustrated, loads the program stored in the storage into the memory, and executes the program loaded by the processor to construct a receiver 101, a controller 102, and a transmitter 103 to execute their respective processes.

When performing a wireless communication (including handover and cell reselection), the communication apparatus 100-1 selects candidate communication apparatuses that are candidates for the wireless communication. In FIG. 1, for example, the communication apparatuses 100-2-1, 2 capable of performing the wireless communication with the communication apparatus 100-1 are selected.

Then, the receiver 101 acquires (receives) power information (IL 12) from the communication apparatuses 100-2-1, 2. The power information is, for example, information included in radio waves (signals) transmitted by the communication apparatuses 100-2-1, 2. Then, the receiver 101 stores the received power information in power information 104.

The controller 102 calculates the transmission power for each of the communication apparatuses 100-2-1, 2 according to (considering with) the received power information. The controller 102 calculates the transmission power, for example, so that the candidate communication apparatuses can receive radio waves with power higher than a required reception power, considering with the power to be attenuated by the influence of the wireless section and the reception sensitivities of the antennas of the candidate communication apparatuses. Then, the controller 102 selects the communication apparatus 100-2 for performing the wireless communication as a candidate communication apparatus for which the transmission power is as small as possible (preferably the smallest). That is, the controller 102 calculates the transmission power amount for the candidate communication apparatuses, considering with (taking into account) the power information, and controls a control such that a candidate communication apparatus for which the calculated transmission power amount is the smallest becomes a communication apparatus (another communication apparatus) that performs the wireless communication with itself.

Then, the transmitter 103 transmits a signal considering with the power information related to the power amount of the signal to be transmitted from the communication apparatus to the candidate communication apparatuses which are candidates for performing the wireless communication. The communication apparatuses (candidate communication apparatuses) to which the transmitter 103 transmits the signal are communication apparatuses controlled (selected) by the controller 102.

In the first embodiment, the communication apparatus 100-1 receives the power information from the candidate communication apparatuses, and calculates the transmission power according to the received power information. Then, the communication apparatus 100-1 selects a candidate communication apparatus for which the transmission power is as small as possible (preferably the smallest) to perform the wireless communication. As a result, power consumption due to the communication apparatus 100-1 transmitting a signal decreases, and power saving is achieved. Further, the fact that the transmission power of the signal transmitted from the communication apparatus 100-1 decreases means that the transmission power of the signal transmitted and received in the communication system decreases, and the degree of interference between the signals also decreases. Due to decrease of the degree of interference of signals, the communication apparatus 100-1 can communicate with high throughput. Furthermore, data is less likely to be retransmitted, efficient utilization of radio resources and frequency utilization efficiency are improved.

Second Embodiment

Figure 2:
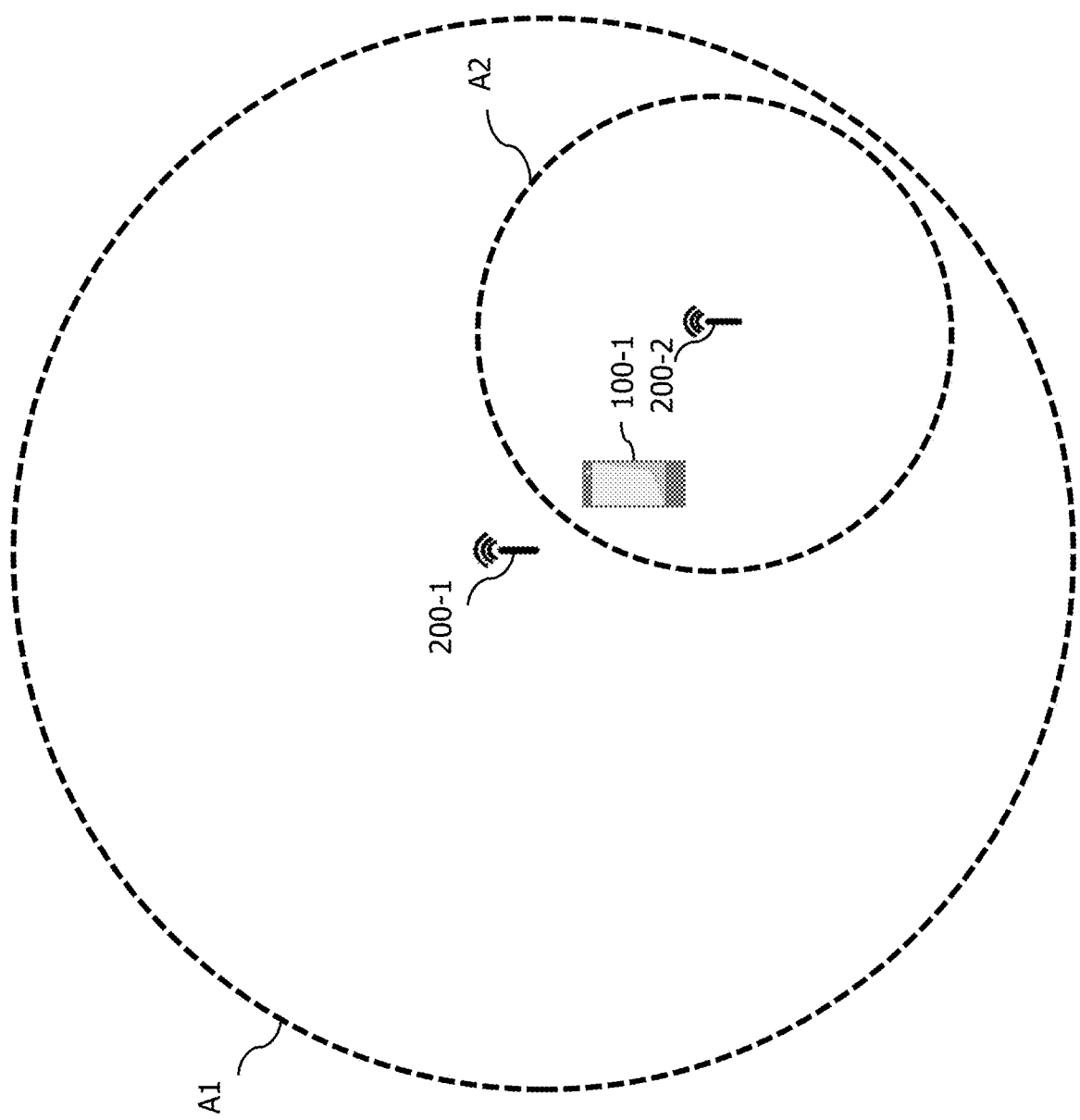
FIG. 2 is a diagram illustrating a configuration example of a wireless communication system 10.

Next, a second embodiment will be described.
<Configuration Example of Communication System>
FIG. 2 is a diagram illustrating a configuration example of a wireless communication system 10. The wireless communication system 10 includes the terminal apparatus 100 and the base station apparatuses 200-1, 2. The wireless communication system 10 is, for example, a communication system compatible with the LTE (Long Term Evolution) communication standard.

The terminal apparatus 100 is a communication apparatus, and is, for example, a mobile terminal such as a tablet terminal or a computer. The terminal apparatus 100 wirelessly connects with, for example, the base station apparatus 200-1. The terminal apparatus 100 communicates with another communication apparatus by transmitting and receiving packets to and from the wirelessly connected base station apparatus 200-1. It is noted that one terminal apparatus 100 is illustrated in FIG. 1, but a plurality of terminal apparatuses may be located therein.

The base station apparatuses 200-1, 2 (hereinafter sometimes referred to as (a) base station apparatus(es) 200) are each a communication apparatus, and are each, for example, an eNodeB (evolved Node B) in LTE. The base station apparatus 200 wirelessly connects to the terminal apparatus 100, and relays the communication of the terminal apparatus 100. The base station apparatus 200 relays the communication of the terminal apparatus 100 by transmitting the packets received from the terminal apparatus 100 to the destination and transmitting the packets whose destination is the terminal apparatus 100 to the terminal apparatus 100.

Further, the base station apparatuses 200-1, 2 have a service area A1 and a service area A2, respectively. In FIG. 1, the service area A1 of the base station apparatus 200-1 is wider than the service area A2 of the base station apparatus 200-2. Thus, the base station apparatus 200-1 is a macrocell, and the base station apparatus 200-2 is a femtocell. It is noted that FIG. 1 illustrates one macrocell and one femtocell, but a plurality of macrocells and femtocells may be provided. Further, a plurality of femtocells may be located in one macrocell.

In FIG. 1, the terminal apparatus 100 is located in an overlapping area of the service area A1 and the service area A2. That is, the terminal apparatus 100 can wirelessly communicate with both of the base station apparatuses 200-1 and 200-2.

When starting a communication, the terminal apparatus 100 selects one of the base station apparatus 200-1 and 200-2, and wirelessly connects to the selected base station apparatus 200 to perform the communication via the wirelessly connected base station apparatus 200. The terminal apparatus 100 selects, for example, the base station apparatus 200 for which radio waves in the downlink from the base station apparatus 200 to the terminal apparatus 100 are in good condition. The downlink radio waves in good condition indicate, for example, that the reception power at the terminal apparatus 100 is high, that the path loss in the downlink is small, or that the radio waves in the downlink have less interference.

In the second embodiment, the terminal apparatus 100 selects the base station apparatus 200 according to the uplink power information. The uplink power information is, for example, information related to a reception power at the base station apparatus 200, such as a path loss in uplink, a reception sensitivity of the antenna of the base station apparatus 200, or a power control value received from the base station apparatus 200. Thus, the terminal apparatus 100 can select the base station apparatus 200 considering with not only the downlink radio wave condition but also the uplink radio wave condition, and does not perform a wireless communication with the base station apparatus 200 for which the uplink radio wave condition is poor. Therefore, the terminal apparatus 100 can prevent a decrease in throughput due to very poor uplink radio wave condition.

Further, the terminal apparatus 100 calculates the transmission power for each of the base station apparatuses 200-1 and 200-2 based on the uplink radio wave condition, and selects the base station apparatus 200 for which the calculated transmission power is as small as possible (preferably the smallest). Thus, the terminal apparatus 100 can wirelessly communicate with the base station apparatus 200 with, for example, the smallest transmission power, and power saving is achieved accordingly. Further, the reduced transmission power of the terminal apparatus 100 results in a reduced power of radio waves in a wireless section, and less interference of the radio waves in the entire wireless section of the wireless communication system 10.

Figure 3:
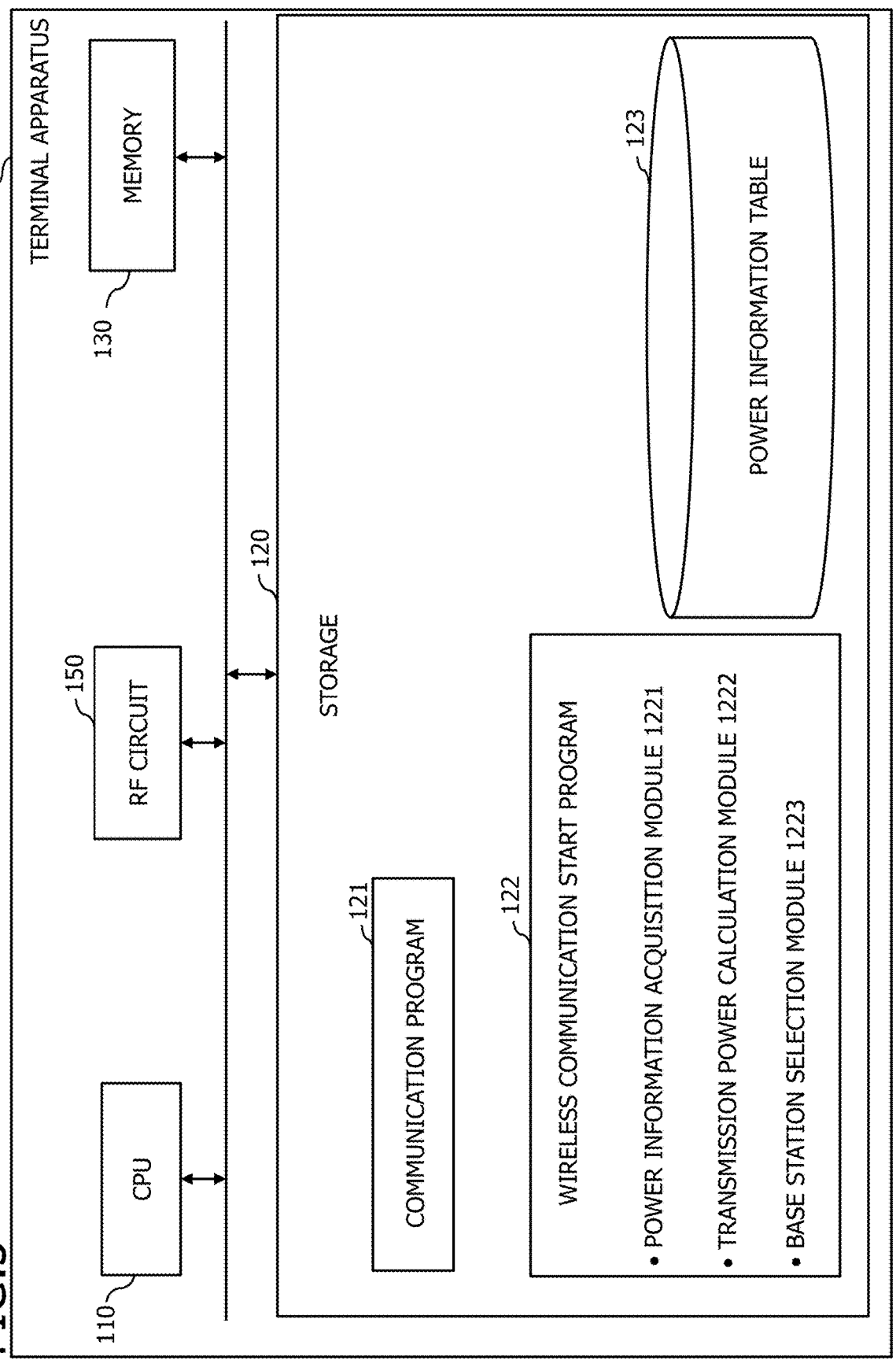
FIG. 3 is a diagram illustrating a configuration example of the terminal apparatus 100.

<Configuration Example of Terminal Apparatus>
FIG. 3 is a diagram illustrating a configuration example of the terminal apparatus 100. The terminal apparatus 100 is a communication apparatus including a CPU (Central Processing Unit) 110, a storage 120, a memory 130 such as a DRAM (Dynamic Random Access Memory), and an RF (Radio Frequency) circuit 150.

The storage 120 is an auxiliary storage device such as a flash memory, an HDD (Hard Disk Drive), or an SSD (Solid State Drive) that stores programs and data. The storage 120 stores a communication program 121, a wireless communication start program 122, and a power information table 123.

The power information table 123 is a table for storing power information acquired (or received) from the candidate base station apparatuses. The terminal apparatus 100 associates, for example, power information with the identifier of the base station apparatus 200, and stores the power information in the power information table 123. The power information is, for example, a reception sensitivity of the antenna of the base station apparatus 200. The power information is, for example, a value of path loss in the uplink or downlink. Further, the power information is, for example, a power control value instructed by the base station apparatus 200.

The memory 130 is an area in which a program stored in the storage 120 is loaded. The memory 130 is also used as an area in which the program stores data.

The RF circuit 150 is a device that wirelessly connects to the base station apparatus 200. The RF circuit 150 includes, for example, an antenna, and communicates with other apparatuses by transmitting and receiving radio waves to and from the base station apparatus 200 connected wirelessly.

The CPU 110 executes the communication program 121 to construct a transmitter and perform a communication process. The communication process is a process for communicating with the communication apparatus which is the communication partner via the base station apparatus 200. In the communication process, the terminal apparatus 100 transmits a packet to the communication apparatus which is the communication partner, for example, via the base station apparatus 200. Further, in the communication process, the terminal apparatus 100 receives a packet from the communication apparatus which is the communication partner, for example, via the base station apparatus 200.

Further, the CPU 110 executes the wireless communication start program 122 to construct a receiver and a controller and perform a wireless communication start process. The wireless communication start process is a process of the terminal apparatus 100 starting a communication with another apparatus. The terminal apparatus 100 selects the base station apparatuses 200 capable of the wireless communication as candidate base station apparatuses (candidate communication apparatuses) in the wireless communication start process, and receives power information which is information related to the power of radio waves transmitted in uplink from the candidate base station apparatuses. Then, in the wireless communication start process, the terminal apparatus 100 selects the base station apparatus 200 for performing the wireless communication from the candidate base station apparatuses according to the received power information.

The CPU 110 executes a power information acquisition module 1221 included in the wireless communication start program 122 to construct the receiver and perform a power information acquisition process. The power information acquisition process is a process of the terminal apparatus 100 acquiring (or receiving) the power information from the candidate base station apparatuses. The terminal apparatus 100 receives the power information from all candidate base station apparatuses in the power information acquisition process, and stores the power information in the power information table 123.

The CPU 110 executes a transmission power calculation module 1222 included in the wireless communication start program 122 to construct a controller and perform a transmission power calculation process. The transmission power calculation process is a process of the terminal apparatus 100 calculating the transmission powers of radio waves to be transmitted to all candidate base station apparatuses. The terminal apparatus 100 calculates the transmission power for each candidate base station apparatus considering with the power information stored in the power information table 123 in the transmission power calculation process.

The CPU 110 executes a base station selection module 1223 included in the wireless communication start program 122 to construct a selection unit and perform a base station selection process. The base station selection process is a process of the terminal apparatus 100 selecting the base station apparatus 200 for performing the wireless communication from the candidate base station apparatuses. The terminal apparatus 100 selects the base station apparatus corresponding to the smallest one of the calculated transmission powers for the respective candidate base station apparatuses.

<Configuration Example of Base Station Apparatus>

Figure 4:
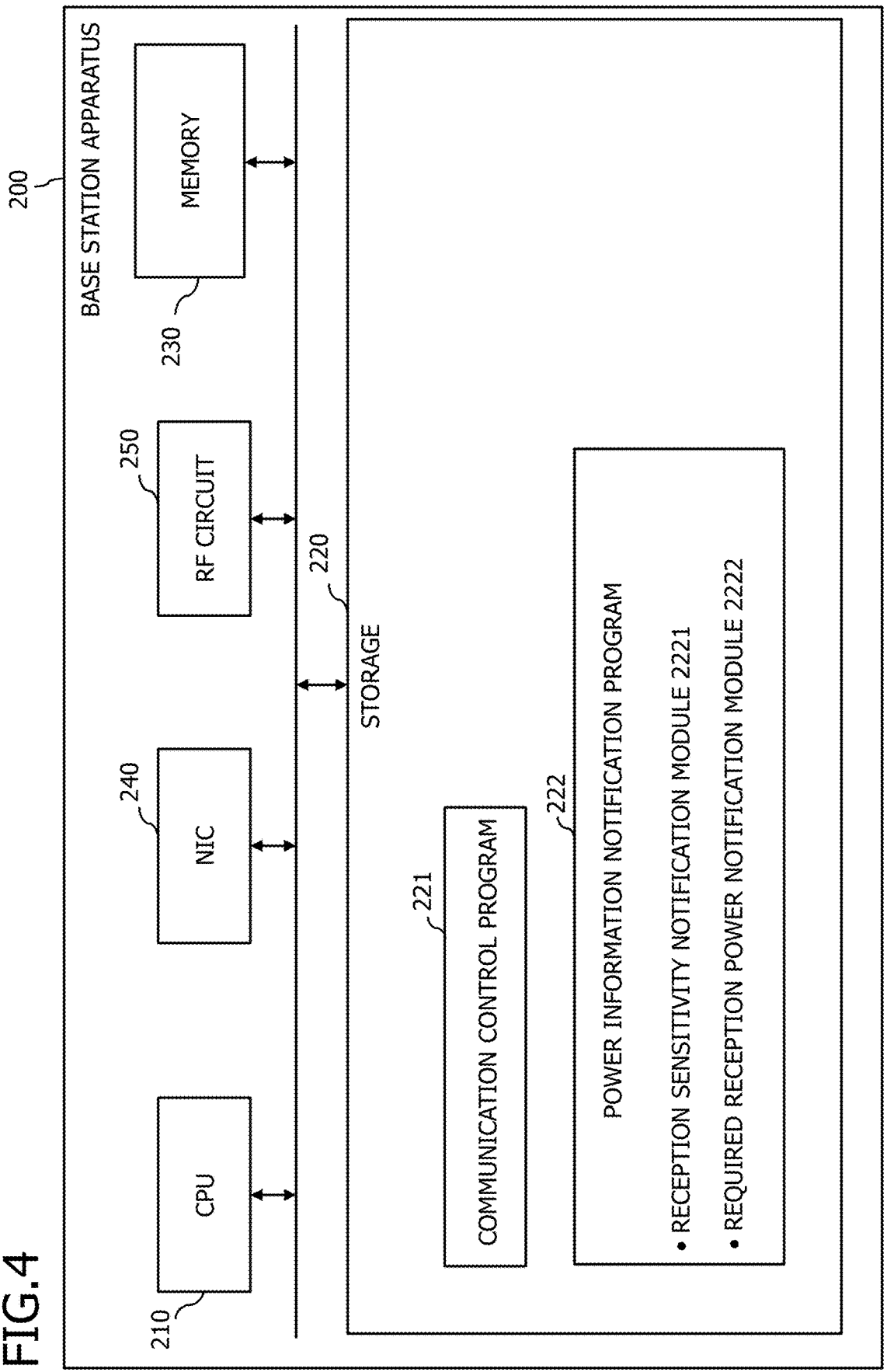
FIG. 4 is a diagram illustrating a configuration example of the base station apparatus 200.

FIG. 4 is a diagram illustrating a configuration example of the base station apparatus 200. The base station apparatus 200 is a communication apparatus including a CPU 210, a storage 220, a memory 230 such as a DRAM, a network interface card (NIC) 240, and an RF circuit 250.

The storage 220 is an auxiliary storage device such as a flash memory, an HDD, or an SSD that stores programs and data. The storage 220 stores a communication control program 221 and a power information notification program 222.

The memory 230 is an area in which a program stored in the storage 220 is loaded. The memory 230 is also used as an area in which the program stores data.

The NIC 240 is a network interface for connecting to another base station apparatus 200 and an external network (not illustrated). The base station apparatus 200 relays the communication of the terminal apparatus 100 by transmitting and receiving packets to and from another communication apparatus or an external network via the NIC 240.

The RF circuit 250 is a device that performs the wireless communication (wireless connection) with the terminal apparatus 100. The RF circuit 250 receives signals (radio waves) transmitted by the terminal apparatus 100 or transmits signals (radio waves) to the terminal apparatus 100 via an antenna.

The CPU 210 executes the communication control program 221 to construct a communication unit and perform a communication control process. The communication control process is a process of relaying the communication performed by the terminal apparatus 100. The base station apparatus 200 transmits, for example, a packet received from the terminal apparatus 100 to the transmission destination of the packet in the communication control process. In the communication control process, for example, when receiving a packet addressed to the terminal apparatus 100, the base station apparatus 200 also transmits the received packet to the terminal apparatus 100.

Further, the CPU 210 executes the power information notification program 222 to construct an information transmitter and perform a power information notification process. The power information notification process is a process of notifying the terminal apparatus 100 of the power information from the base station apparatus 200. In the power information notification process, for example, the base station apparatus 200 notifies notification information including the power information. Alternatively, the base station apparatus 200 transmits, for example, a message including the power information to the terminal apparatus 100 in the power information notification process.

The CPU 210 executes a reception sensitivity notification module 2221 included in the power information notification program 222 to construct a notification unit and perform a reception sensitivity notification process. The reception sensitivity notification process is a process of notifying the terminal apparatus 100 of a reception sensitivity of the antenna of the base station apparatus 200 as the power information.

The CPU 210 executes a request reception power notification module 2222 included in the power information notification program 222 to construct a notification unit and perform a required reception power notification process. The required reception power notification process is a process of notifying the terminal apparatus 100 of a required reception power which is a reception power required (requested) when the base station apparatus 200 communicates with the terminal apparatus 100, as the power information.

<Wireless Communication Start Process>

Figure 5:
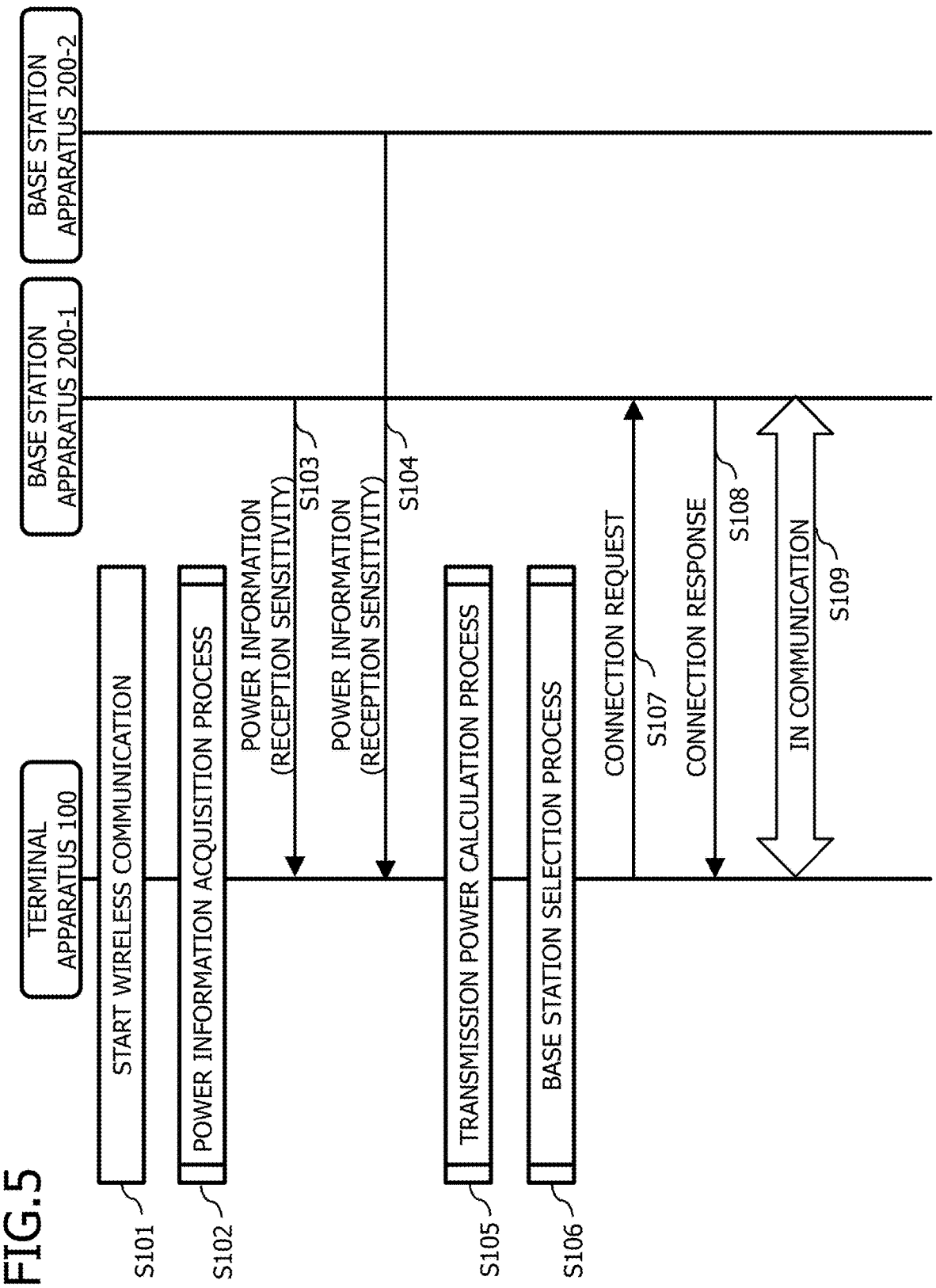
FIG. 5 is a diagram illustrating an example of a sequence of the wireless communication start process in the terminal apparatus 100.

FIG. 5 is a diagram illustrating an example of a sequence of the wireless communication start process in the terminal apparatus 100. As illustrated in FIG. 2, the terminal apparatus 100 is located in a region where a wireless communication can be performed with both of the base station apparatuses 200-1 and 200-2.

The terminal apparatus 100 starts the wireless communication (S101). The terminal apparatus 100 starts the wireless communication, for example, when detecting that the user of the terminal apparatus 100 starts a call or data communication. Further, the start of the wireless communication may be, for example, handover or cell reselection (reselection of a base station apparatus) in which the terminal apparatus 100 changes the base station apparatus in wireless communication to another base station apparatus. Furthermore, the handover and the cell reselection may be caused by the change of the configuration of the communication area due to the change of the transmission output of radio waves transmitted by the base station apparatus 200 by CRE.

The terminal apparatus 100 performs the power information acquisition process (S102). The terminal apparatus 100 acquires (or receives) the power information from the candidate base station apparatuses, for example, in the power information acquisition process.

Figure 6:
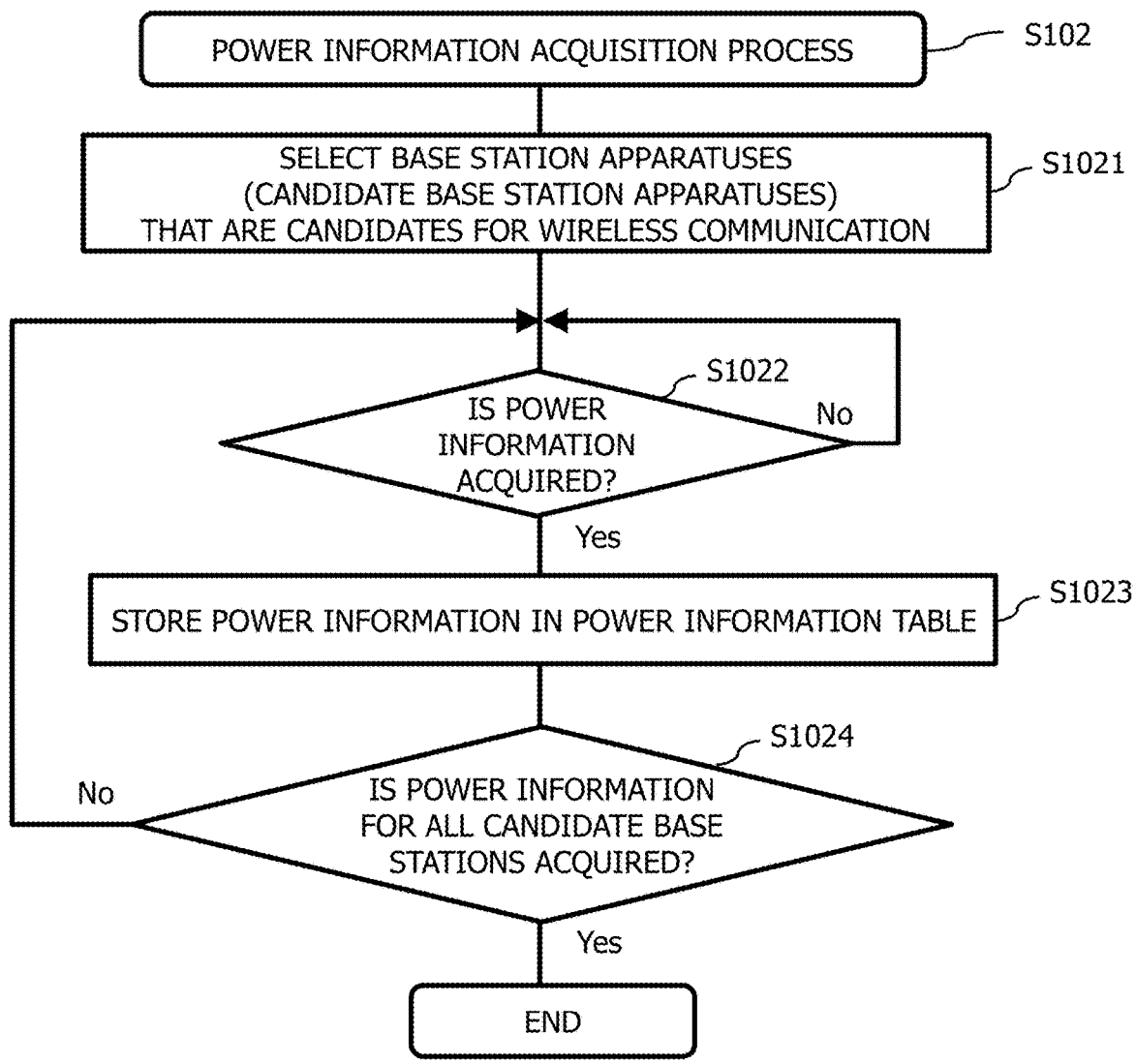
FIG. 6 is a diagram illustrating an example of a process flowchart of the power information acquisition process S102.

FIG. 6 is a diagram illustrating an example of a process flowchart of the power information acquisition process S102. The terminal apparatus 100 selects base station apparatuses (candidate base station apparatuses) to be candidates for wireless communication in the power information acquisition process (S1021). Then, the terminal apparatus 100 waits to acquire (or receive) the power information from candidate base station apparatuses (No in S1022).

When the terminal apparatus 100 receives the power information (Yes in S1022), the terminal apparatus 100 stores the received power information in the power information table 123 (S1023). The terminal apparatus 100 waits until power information is received from all candidate base station apparatuses (No in S1024).

When the terminal apparatus 100 receives the power information from all candidate base station apparatuses (Yes in S2014), the process ends.

Returning to the sequence of FIG. 5, the terminal apparatus 100 receives the power information from the base station apparatus 200-1 in the power information acquisition process S102 (S103). In the sequence of FIG. 5, the power information includes a reception sensitivity of the antenna of the base station apparatus 200. The terminal apparatus 100 stores the power information of the base station apparatus 200-1 in the power information table 123 (S1023 in FIG. 6).

In addition, the terminal apparatus 100 receives the power information from the base station apparatus 200-2 (S104), and stores the power information in the power information table 123 (S1023 in FIG. 6).

It is noted that when the terminal apparatus 100 is in the idle mode in which the terminal apparatus 100 is not wirelessly connected to the base station apparatus 200, the base station apparatus 200 notifies the terminal apparatus 100 of notification information including the power information (reception sensitivity). Further, when the terminal apparatus 100 is in which the connected mode in the terminal apparatus 100 can receive an individual signal from the base station apparatus 200, the base station apparatus 200 notifies the terminal apparatus 100 of the individual signal (Measurement) including the power information (reception sensitivity). It is noted that the power information received in the idle mode may be continuously used.

FIG. 7 is a diagram illustrating an example of the power information table 123 at the end of the power information acquisition process. The power information table 123 stores, for example, "Base station apparatus", "Reception sensitivity", and "Required reception power".

"Base station apparatus" is, for example, an identifier for uniquely identifying the base station apparatus 200. The identifier is, for example, an eNodeB identifier in LTE. Further, the identifier may be, for example, a MAC (Media Access Control) address.

"Required sensitivity" is a value related to the reception sensitivity of the antenna of the base station apparatus 200. "Required sensitivity" indicates, for example, an amount of power (reception sensitivity reduced power) at which the reception power at the base station apparatus 200 is attenuated according to the reception sensitivity of the antenna. In FIG. 7, "Reception sensitivity" for the base station apparatus 200-1 is "10". This indicates that the power obtained by subtracting "10" from the power of the signal (radio wave) that has reached the base station apparatus 200-1 is the reception power of the base station apparatus 200-1. The unit of "Reception sensitivity" is, for example, dBm.

It is noted that the unit of "Reception sensitivity" may be dBi, which is the unit expressing the gain of the antenna. Further, when the unit of the reception sensitivity included in the power information is dBi, the terminal apparatus 100 may store a value obtained by converting the acquired (or received) reception sensitivity into the unit of dBm.

"Required reception power" is reception power required (requested) by the base station apparatus 200. The unit of "Required reception power" is, for example, dBm. The required reception power may be included, for example, in the power information (S103, S104) in the sequence of FIG. 5. Further, the terminal apparatus 100 may receive the required reception power included in the notification information (not illustrated) received while no wireless communication is established (for example, an idle state), and store the required reception power in the internal memory. In FIG. 7, "Required reception power" for the base station apparatus 200-1 is "40". This indicates that the required reception power of the base station apparatus 200-1 is 40 dBm, and the base station apparatus 200-1 requires a reception power of 40 dBm when performing a wireless communication with the terminal apparatus 100.

Returning to the sequence of FIG. 5, the terminal apparatus 100 performs the transmission power calculation process (S105).

Figure 8:
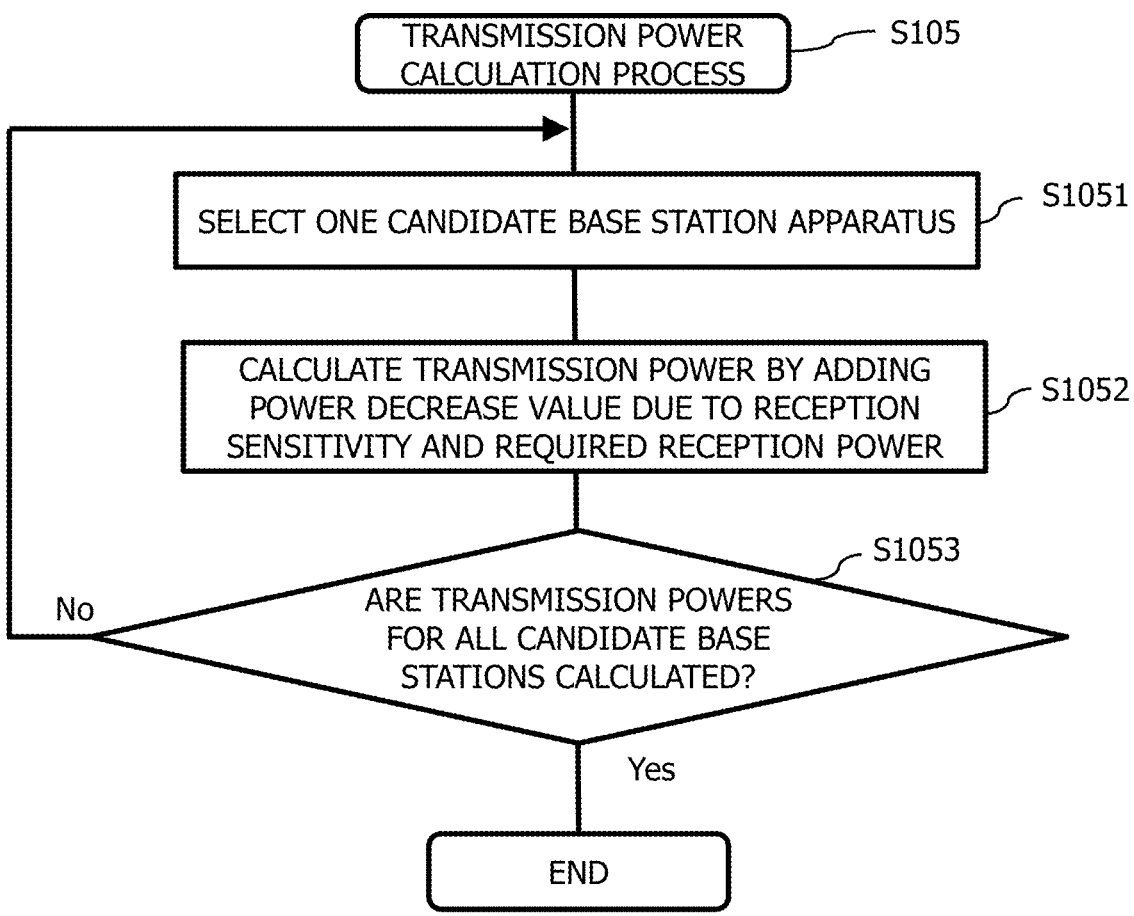
FIG. 8 is a diagram illustrating an example of a process flowchart of the transmission power calculation process S105.

FIG. 8 is a diagram illustrating an example of a process flowchart of the transmission power calculation process S105. The terminal apparatus 100 selects at least one candidate base station apparatus (S1051). Then, the terminal apparatus 100 adds a power decrease value due to the reception sensitivity of the selected candidate base station apparatus and the required reception power to calculate a transmission power (S1052). The terminal apparatus 100 repeats the processes of S1051 and S1052 until the transmission powers for all candidate base station apparatuses are calculated (No in S1053). When the terminal apparatus 100 calculates the transmission powers for all candidate base station apparatuses (Yes in S1053), the process ends.

As described as "at least one", a plurality of base station apparatuses may be selected out of the candidate base station apparatuses. For example, as in dual connectivity, the terminal apparatus 100 may communicate with a plurality of base station apparatuses 200.

Returning to the sequence of FIG. 5, the terminal apparatus 100 calculates the transmission power for the base station apparatuses 200-1, 2 in the transmission power calculation process S105 (S1052 in FIG. 8).

FIG. 9 is a diagram illustrating an example of the power information table 123 including the transmission power. According to FIG. 9, for example, for the base station apparatus 200-1, the power decrease value due to the reception sensitivity is "10", and the required reception power is "40". The terminal apparatus 100 calculates the transmission power for the base station apparatus 200-1 as 50 (10+40) dBm. Similarly, the terminal apparatus 100 calculates the transmission power for the base station apparatus 200-2 as 55 (20+35) dBm.

Returning to the sequence of FIG. 5, the terminal apparatus 100 performs the base station selection process (S106). In the base station selection process S106, the terminal apparatus 100 selects, for example, the base station apparatus 200-1 for which the transmission power is as small as possible (preferably the smallest) as the base station apparatus 200 for performing the wireless communication.

It is noted that in the base station selection process S106, the terminal apparatus 100 may select the base station apparatus 200 considering with the downlink radio wave conditions such as the reception power at the terminal apparatus 100 and the radio wave condition in downlink in which interference occurs, for example. In this case, the terminal apparatus 100 selects, for example, a base station apparatus 200 for which the sum of the reception power and the transmission power is the smallest. Alternatively, the terminal apparatus 100 may select a base station apparatus 200 for which the reception power is equal to or higher than a threshold and the transmission power is the smallest.

The terminal apparatus 100 transmits a connection request for requesting a wireless connection to the base station apparatus 200-1 to perform a wireless communication with the selected base station apparatus 200-1 (S107), receives a connection response for accepting the wireless connection from the base station apparatus 200-1 (S108), and then enters the wireless connection state (S109).

In the second embodiment, the terminal apparatus 100 acquires (or receives) the information related to the reception sensitivity of the antenna of the base station apparatus 200 as the power information. Then, the terminal apparatus 100 calculates the transmission power for the base station apparatus 200 considering with the power decrease value due to the reception sensitivity of the antenna, and performs a wireless communication with the base station apparatus 200 for which the transmission power is the smallest. Thus, the power consumption due to the terminal apparatus 100 transmitting signals (radio waves) decreases, and power saving is achieved. Further, the fact that the transmission power of the radio wave transmitted from the terminal apparatus 100 becomes small means that the transmission power of the radio wave transmitted and received in the wireless communication system 10 becomes small, and the degree of interference between the radio waves also becomes small, resulting in an increased throughput of the terminal apparatus 100.

Modification of Second Embodiment

FIG. 10 is a diagram illustrating an example of the power information table 123 in a modification of the second embodiment. In the modification, the transmission power is calculated considering with the uplink path loss.

The terminal apparatus 100 calculates the transmission power considering with the power decrease value (wireless decrease power) due to the path loss in addition to the power decrease value due to the reception sensitivity and the required reception power. The terminal apparatus 100 calculates, as the transmission power, a numerical value of a sum of the power decrease value due to the reception sensitivity, the required reception power, and the power decrease value due to the path loss. According to FIG. 10, for example, for the base station apparatus 200-1, the reception sensitivity is "10", the required reception power is "40", and the power decrease value due to the path loss is "10". That is, in order to achieve the reception power required by the base station apparatus 200-1 (40 dBm), the terminal apparatus 100 transmits radio waves with a transmission power considering with the power decrease value due to the reception sensitivity and the path loss (10+10=20 dBm). Therefore, the terminal apparatus 100 calculates the sum of the required reception power and the power decrease value due to the reception sensitivity and the path loss (40+10+ 10=60 dBm), as the transmission power for the base station apparatus 200-1. Similarly, the terminal apparatus 100 calculates the transmission power for the base station apparatus 200-2 as 63 dBm (=35+20+8).

Then, the terminal apparatus 100 selects the base station apparatus 200-1 for which the transmission power is the smallest as the base station apparatus 200 for performing the wireless communication, and performs the wireless communication.

In the modification, the terminal apparatus 100 further calculates the transmission power for the base station apparatus 200 considering with the uplink path loss. As a result, the calculation accuracy of transmission power increases, and the probability of selecting the base station apparatus 200 with a small transmission power increases accordingly.

Third Embodiment

Next, a third embodiment will be described. In the third embodiment, the power information includes a power control value of the base station apparatus 200.

<Configuration Example of Base Station Apparatus>

Figure 11:
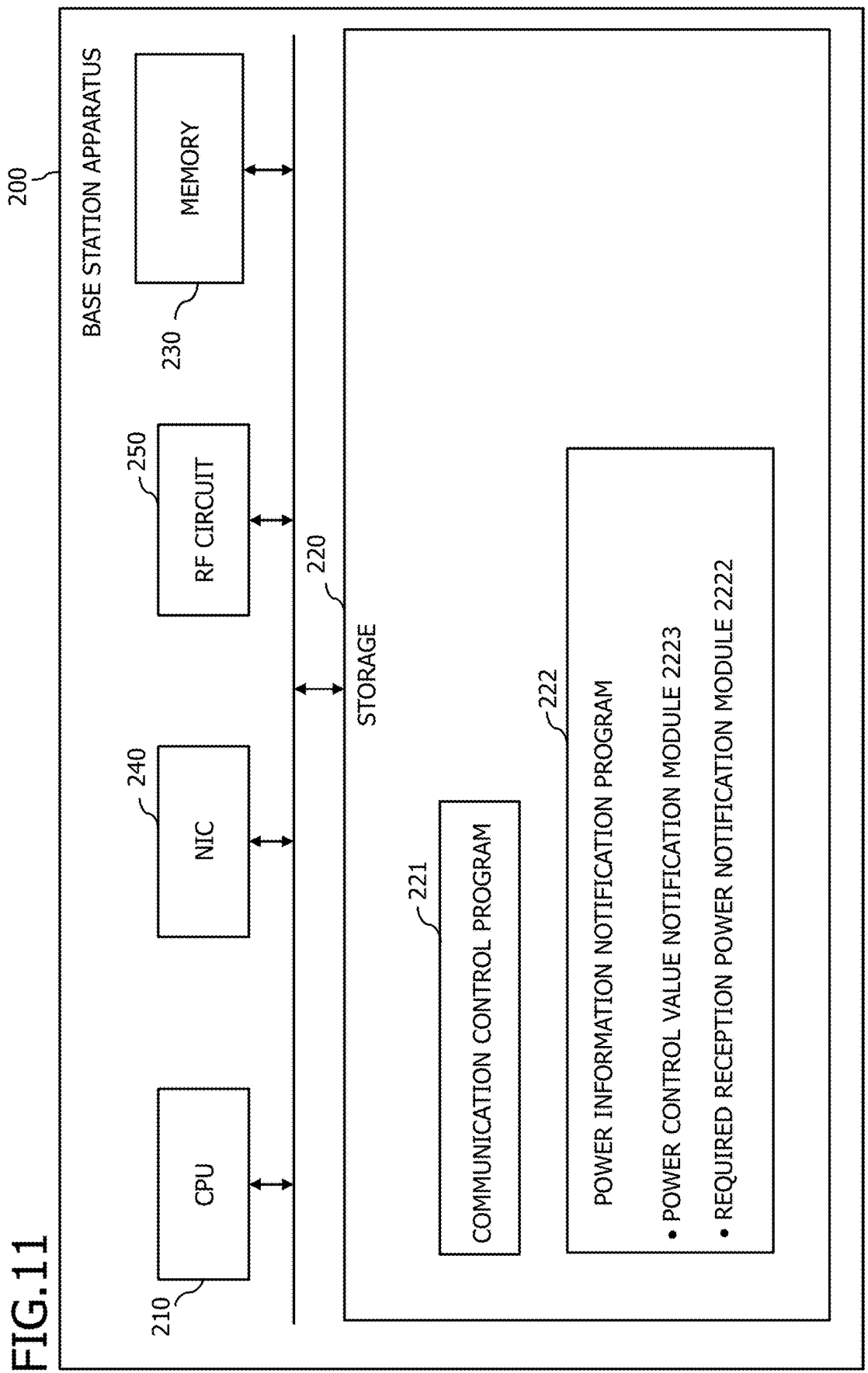
FIG. 11 is a diagram illustrating a configuration example of the base station apparatus 200.

FIG. 11 is a diagram illustrating a configuration example of the base station apparatus 200. The storage 220 further stores a power control value notification module 2223 in the power information notification program 222. The other configuration of the base station apparatus 200 is the same as that of the base station apparatus 200 illustrated in FIG. 4.

The CPU 210 executes a power control value notification module 2223 included in the power information notification program 222 to construct a notification unit and perform a power control value notification process. The power control value notification process is a process of the base station apparatus 200 notifying the terminal apparatus 100 of a value (power) at which the base station apparatus 200 requests the terminal apparatus 100 to change the transmission power. For example, when the base station apparatus 200 wants the terminal apparatus 100 to increase the transmission power by 5 dBm, the power control value is for notifying the terminal apparatus 100 of "+5 dBm". That is, the power control value is an increased power amount indicating a transmission power amount that the terminal apparatus 100 increases.

<Wireless Communication Start Process>

Figure 12:
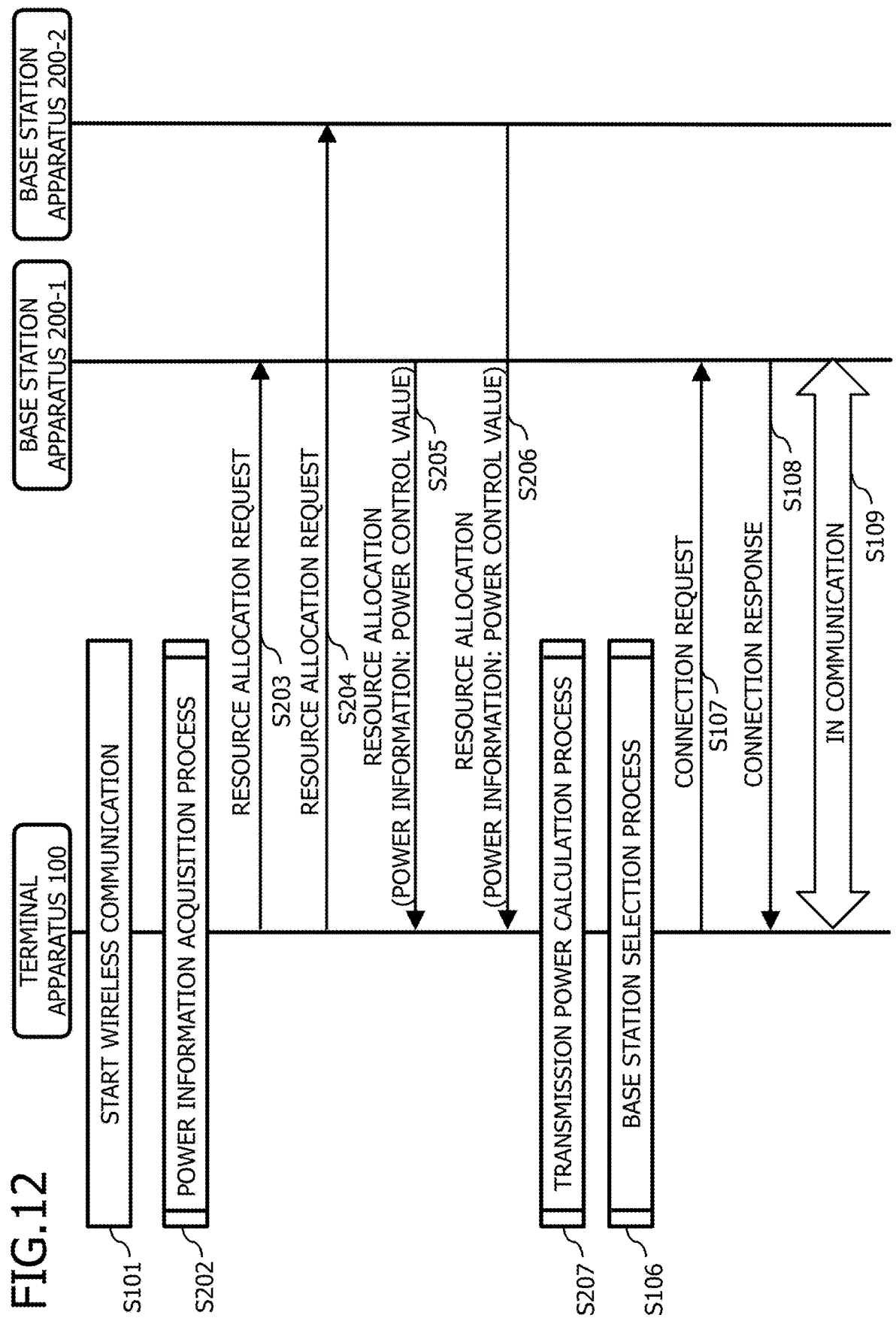
FIG. 12 is a diagram illustrating an example of a sequence of the wireless communication start process in the terminal apparatus 100.

FIG. 12 is a diagram illustrating an example of a sequence of the wireless communication start process in the terminal apparatus 100. As illustrated in FIG. 2, the terminal apparatus 100 is located in a region where a wireless communication can be performed with both of the base station apparatuses 200-1 and 200-2.

The terminal apparatus 100 starts the wireless communication (S101). The start of wireless communication S101 is the same as in the sequence of FIG. 5.

The terminal apparatus 100 performs the power information acquisition process (S202). The terminal apparatus 100 acquires (or receives) the power information from the candidate base station apparatuses, for example, in the power information acquisition process.

Figure 13:
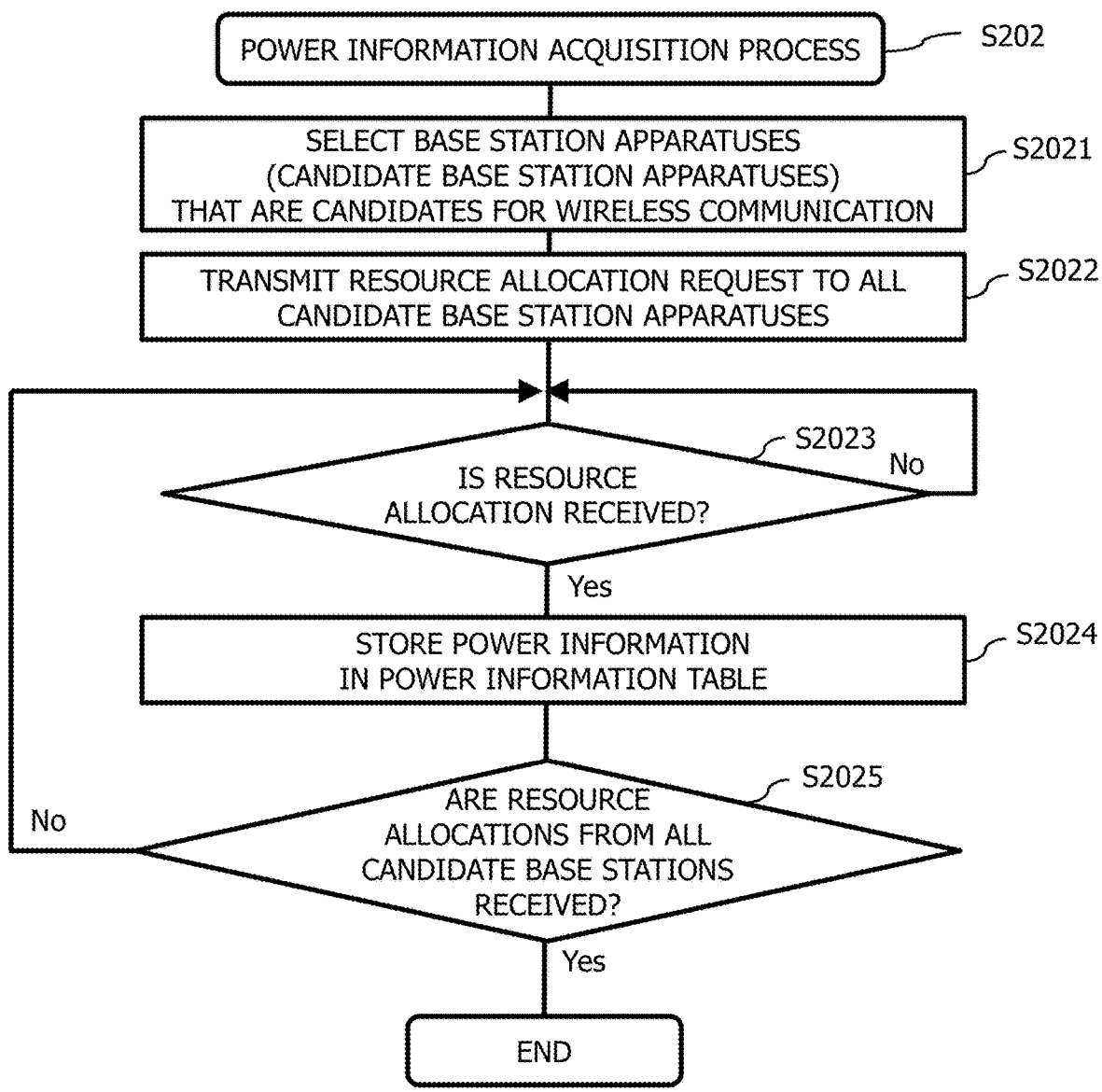
FIG. 13 is a diagram illustrating an example of a process flowchart of the power information acquisition process S202.

FIG. 13 is a diagram illustrating an example of a process flowchart of the power information acquisition process S202. The terminal apparatus 100 selects base station apparatuses (candidate base station apparatuses) which are to be candidates for wireless communication in the power information acquisition process (S2021). Then, the terminal apparatus 100 transmits a resource allocation request to all candidate base station apparatuses (S2022). The resource allocation request is, for example, a PRACH (Physical Random Access Channel) or an RACH (Random Access Channel) in LTE.

The terminal apparatus 100 waits for resource allocation from the candidate base station apparatus (No in S2023). Then, when receiving the resource allocation (Yes in S2023), the terminal apparatus 100 stores the power information (for example, the control resource value, or an initial transmission power indicating the transmission power at which the resource allocation request is transmitted) in the power information table 123 (S2024). The resource allocation is, for example, an RAR (Random Access Response) in LTE.

The terminal apparatus 100 waits to receive resource allocations from all candidate base station apparatuses (No in S2025), and when the resource allocations are received from all candidate base station apparatuses (Yes in S2025), the process ends.

It is noted that the terminal apparatus 100 acquires the power control value included in the resource allocation in the process flowchart of FIG. 13, but the power control value may be included in any message.

Returning to the sequence of FIG. 12, the terminal apparatus 100 transmits a resource allocation request to the base station apparatuses 200-1, 2 in the power information acquisition process S202 (S203, S204). Then, the terminal apparatus 100 receives resource allocation (including a power control value as the power information) from each of the base station apparatuses 200-1, 2 (S205, S206), and updates the power information table 123 (S2024 in FIG. 13).

FIG. 14 is a diagram illustrating an example of the power information table 123 at the end of the power information acquisition process. The power information table 123 stores, for example, "Base station apparatus", "Initial transmission power", and "Power control value".

"Base station apparatus" is, for example, an identifier for uniquely identifying the base station apparatus 200, as in FIG. 7.

"Initial transmission power" is a value of initial transmission power indicating a transmission power when the terminal apparatus 100 transmits the resource allocation request. The unit of "Initial transmission power" is, for example, dBm. "Initial transmission power" is stored, for example, at the time of resource allocation transmission.

"Power control value" is a power control value of the base station apparatus 200. For example, the base station apparatus 200 measures a reception power when the resource allocation request is received, calculates a difference between the reception power and the required reception power required by the base station apparatus 200, and notifies the terminal apparatus 100 of the calculated difference as the power control value.

In FIG. 14, the initial transmission power for the base station apparatuses 200-1, 2 is "20" dBm, the power control value for the base station apparatus 200-1 is "+5" dBm, and the power control value for the base station apparatus 200-2 is "+10" dBm.

Returning to the sequence of FIG. 12, the terminal apparatus 100 performs the transmission power calculation process (S207).

Figure 15:
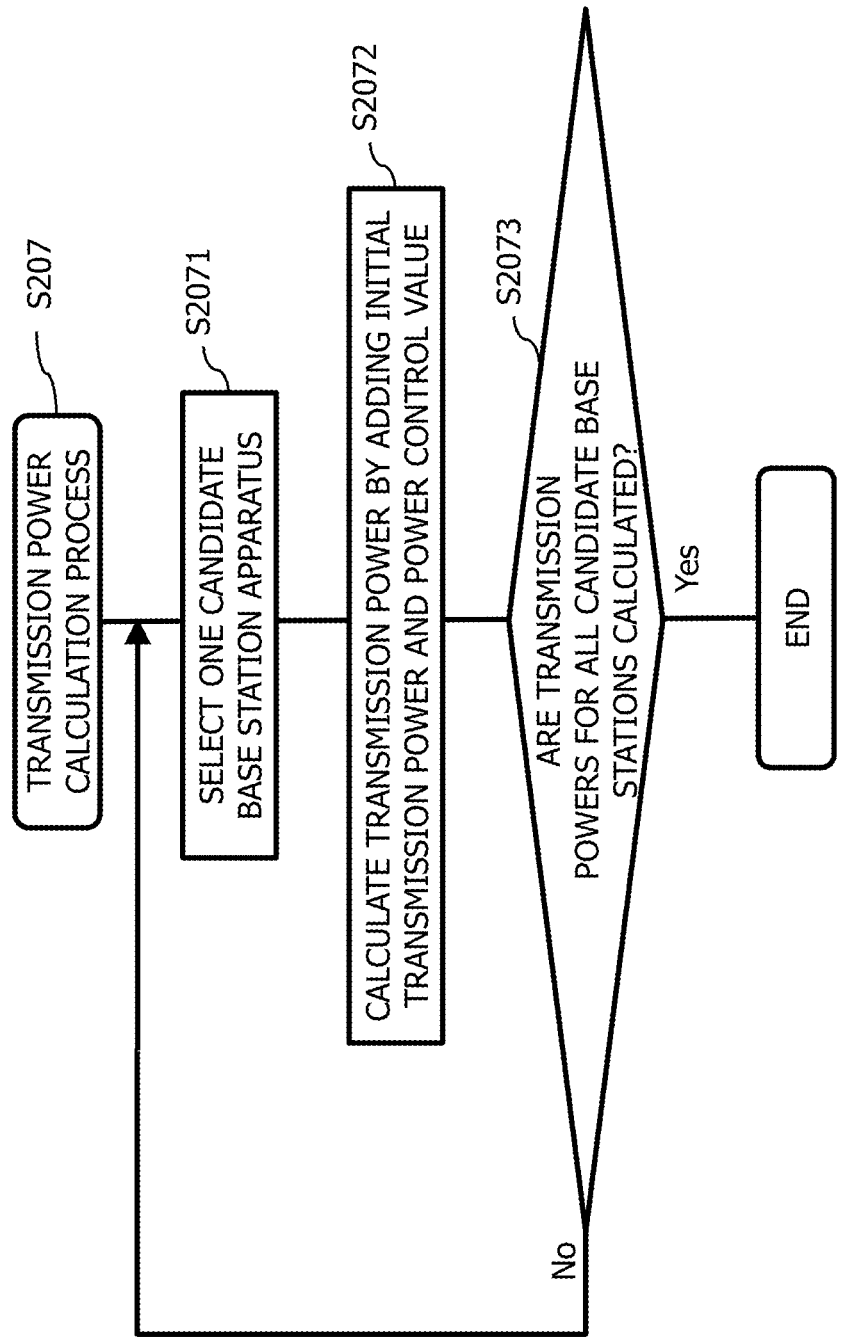
FIG. 15 is a diagram illustrating an example of a process flowchart of the transmission power calculation process S207.

FIG. 15 is a diagram illustrating an example of a process flowchart of the transmission power calculation process S207. The terminal apparatus 100 selects one candidate base station apparatus (S2071). Then, the terminal apparatus 100 adds the initial transmission power and the power control value of the selected candidate base station apparatus to calculate the transmission power (S2072). The terminal apparatus 100 repeats the processes of S2071 and S2072 until the transmission powers for all candidate base station apparatuses are calculated (No in S2073). When the terminal apparatus 100 calculates the transmission powers for all candidate base station apparatuses (Yes in S2073), the process ends.

Returning to the sequence of FIG. 12, the terminal apparatus 100 calculates the transmission power for the base station apparatuses 200-1, 2 in the transmission power calculation process S207 (S2072 in FIG. 15).

FIG. 16 is a diagram illustrating an example of the power information table 123 including the transmission power. According to FIG. 16, for example, for the base station apparatus 200-1, the initial transmission power is "20", and the power control value is "+5". The terminal apparatus 100 calculates the transmission power for the base station apparatus 200-1 as 25 (20+(+5)) dBm. Similarly, the terminal apparatus 100 calculates the transmission power for the base station apparatus 200-2 as 30 (20+(+10)) dBm.

Returning to the sequence of FIG. 12, the terminal apparatus 100 performs the base station selection process (S106). Thereafter, the processes of S106 to S109 are the same as the processes illustrated in the sequence of FIG. 5.

In the third embodiment, the terminal apparatus 100 acquires the power control value as the power information. The power control value is, for example, an information element included in an RAR in LTE, and can be acquired using a conventional message. The terminal apparatus 100 acquires the power control value using a conventional message by executing part of the sequence of wireless connection to all candidate base station apparatuses. Thus, the terminal apparatus 100 can select the base station apparatus 200 for which the transmission power is the smallest, without using a new message.

In the third embodiment, the resource allocation request is transmitted on the basis of the base station apparatuses 200, but may be transmitted, for example, on the basis of beam installed in each predetermined direction. When the terminal apparatus 100 implements the beamforming function, it is possible to transmit the RACH on a beam basis.

OTHER EMBODIMENTS

The processes in each embodiment may be combined with each other.

For example, the process of calculating a transmission power considering with the path loss in the modification of the second embodiment may be performed in the third embodiment. Further, the process of selecting the base station apparatus 200 considering with the state of radio waves in downlink described in the second embodiment may be performed in the modification of the second embodiment or in the third embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication apparatus in a communication system including a plurality of communication apparatuses, the communication apparatus comprising:
   a controller configured to, in a wireless communication start process during non-connected mode with another communication apparatus, considering power information related to a power amount of a signal to be transmitted from the communication apparatus to candidate communication apparatuses that are candidates for performing the wireless communication, calculate a transmission power amount for the candidate communication apparatuses, and perform a control such that a candidate communication apparatus for which the calculated transmission power amount is the smallest becomes the other communication apparatus for performing the wireless communication;
   a receiver configured to receive notification information from the candidate communication apparatuses as a cell-specific information during non-connected mode; and
   a transmitter configured to transmit a signal to the other communication apparatus according to the power information which is a required reception power at the candidate communication apparatuses included in the notification information.

2. The communication apparatus according to claim 1, wherein
   the power information includes reception sensitivities of antennas of the candidate communication apparatuses, and
   the controller calculates transmission power amounts for the candidate communication apparatuses considering with the reception sensitivities.

3. The communication apparatus according to claim 2, further comprising a receiver configured to receive the reception sensitivities from information notified by the candidate communication apparatuses.

4. The communication apparatus according to claim 2, further comprising a receiver configured to receive the reception sensitivities by receiving signals including the reception sensitivities that are transmitted to the communication apparatus by the candidate communication apparatuses.

5. The communication apparatus according to claim 2, wherein
   the power information further includes required reception power indicating reception power required by the candidate communication apparatuses, and
   the controller calculates the transmission power amount such that the reception power at the candidate communication apparatuses is the required reception power.

6. The communication apparatus according to claim 5, further comprising a receiver configured to receive the required reception power by receiving signals including the required reception power that is transmitted to the communication apparatus by the candidate communication apparatuses.

7. The communication apparatus according to claim 5, wherein the controller calculates, as the transmission power amount for the candidate communication apparatuses, a power amount obtained by adding to the required reception power a reception sensitivity decrease power indicating a power amount that is reduced according to the reception sensitivity at the candidate communication apparatuses.

8. The communication apparatus according to claim 5, wherein
   the power information further includes a wireless decrease power indicating a power amount to be reduced in a wireless section until a radio wave transmitted by the communication apparatus to the candidate communication apparatuses reaches the candidate communication apparatuses, and
   the controller calculates, as the transmission power amount for the candidate communication apparatuses, a power amount obtained by adding to the required reception power a reception sensitivity decrease power indicating a power amount that is reduced according to the reception sensitivity at the candidate communication apparatuses and the wireless decrease power.

9. The communication apparatus according to claim 1, wherein
   the power information is an increased power amount by which the candidate communication apparatuses requests the communication apparatus to increase the transmission power of the communication apparatus, and
   the controller calculates transmission power for each of the candidate communication apparatuses considering with the increased amount of power.

10. The communication apparatus according to claim 9, wherein the controller further transmits a connection request for requesting a wireless connection to the candidate communication apparatuses, receives a response including the increased power amount to the connection request, and calculates the transmission power amount for the candidate communication apparatuses according to initial transmission power with which the connection request is transmitted to the candidate communication apparatuses and the increased power amount included in the received response.

11. The communication apparatus according to claim 10, wherein the controller calculates, as the transmission power amount for the candidate communication apparatuses, power obtained by adding the increased power amount included in the received response to the initial transmission power.

12. The communication apparatus according to claim 1, wherein the candidate communication apparatuses are base station apparatuses that perform a process of relaying a communication of the communication apparatus in which a packet received from the communication apparatus is transmitted to a destination, and a packet addressed to the communication apparatus is transmitted to the communication apparatus.

13. The communication apparatus according to claim 1, wherein performing a wireless communication with the other communication apparatus includes changing a communication apparatus in wireless communication with the communication apparatus to the other communication apparatus.

14. The communication apparatus according to claim 1, wherein the transmitter transmits a signal to the other communication apparatus using a random access channel in consideration with the power information.

15. A communication apparatus in a communication system including a plurality of communication apparatuses, the communication apparatus comprising:
an information transmitter configured to, when the communication apparatus is a candidate communication apparatus that is a candidate for performing a wireless communication start process during non-connected mode with another communication apparatus, transmit, to the other communication apparatus, power information related to a transmission power amount of a signal transmitted from the other communication apparatus to the communication apparatus and notification information as a cell-specific information during non-connected mode; and
a communicator configured to, when the other communication apparatus wirelessly communicates with the communication apparatus according to the transmission power amount for the communication apparatus calculated from the power information, perform the wireless communication with the other communication apparatus, wherein the power information is a required reception power at the communication apparatus included in the notification information.

16. The communication apparatus according to claim 15, wherein
the power information includes a reception sensitivity of an antenna of the communication apparatus, and
the other communication apparatus calculates the transmission power amount considering with the reception sensitivity.

17. The communication apparatus according to claim 16, wherein the information transmitter includes the reception sensitivity in information notified to the plurality of communication apparatuses.

18. The communication apparatus according to claim 16, wherein the information transmitter transmits information including the reception sensitivity to be transmitted to the other communication apparatus.

19. A communication system comprising a plurality of communication apparatuses, wherein
a first communication apparatus, when performing a wireless communication start process during non-connected mode with another communication apparatus, considers power information related to a power amount of a signal to be transmitted from the first communication apparatus to second communication apparatuses that are candidates for performing the wireless communication, calculates a transmission power amount for the second communication apparatuses, performs a control such that a second communication apparatus for which the calculated transmission power amount is the smallest becomes a third communication apparatus for performing the wireless communication, receives notification information from the second communication apparatuses as a cell-specific information during non-connected mode, and requests the wireless communication to the third communication apparatus, and
the third communication apparatus performs the wireless communication with the first communication apparatus in response to the request from the first communication apparatus, wherein the power information is required reception power at the third communication apparatus included in the notification information.

* * * * *